United States Patent
Twede et al.

(10) Patent No.: US 9,521,336 B1
(45) Date of Patent: Dec. 13, 2016

(54) MULTI-SPECTRAL PHOTON CONVERTING IMAGING APPARATUS

(71) Applicant: Lockheed Martin Corporation, Bethesda, MD (US)

(72) Inventors: David R. Twede, Orlando, FL (US); Scott L. Roberson, Orlando, FL (US); Suresh Subramanian, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 108 days.

(21) Appl. No.: 13/891,692

(22) Filed: May 10, 2013

Related U.S. Application Data

(60) Provisional application No. 61/645,514, filed on May 10, 2012.

(51) Int. Cl.
*H04N 5/76* (2006.01)
*H04N 5/335* (2011.01)

(52) U.S. Cl.
CPC ............................ *H04N 5/335* (2013.01)

(58) Field of Classification Search
CPC ..................................... H04N 5/2254
USPC ............................. 348/294, 231.99
See application file for complete search history.

(56) References Cited

U.S. PATENT DOCUMENTS

| | | | |
|---|---|---|---|
| 4,872,187 A | 10/1989 | Nakahata et al. | |
| 6,292,534 B1 | 9/2001 | Linders et al. | |
| 6,950,492 B2 | 9/2005 | Besson | |
| 6,960,767 B1 | 11/2005 | Do et al. | |
| 7,121,474 B2 | 10/2006 | Bourianoff et al. | |
| 7,477,727 B1 | 1/2009 | Malashanko | |
| 7,532,703 B2 | 5/2009 | Du et al. | |
| 7,804,103 B1 * | 9/2010 | Zhai | H01L 33/504 257/79 |
| 7,937,280 B1 | 5/2011 | Leung et al. | |

(Continued)

FOREIGN PATENT DOCUMENTS

WO    2012174173 A2    12/2012

OTHER PUBLICATIONS

Author Unknown, "Luminescent Up-conversion Nanocrystals," Biochemical Products, Sigma-Aldrich Co. LLC, 2013, http://www.sigmaaldrich.com/life-science/biochemicals/biochemical-products, accessed Apr. 23, 2013, 1 page.

(Continued)

*Primary Examiner* — Joel Fosselman
(74) *Attorney, Agent, or Firm* — Withrow & Terranova, PLLC

(57) ABSTRACT

A multi-spectral photon converting imaging apparatus and method are disclosed. A plurality of photons in a first received band and a plurality of photons in a second received band are received by a first nanoparticle photon conversion material. The first nanoparticle photon conversion material converts the plurality of photons in the first received band to a plurality of photons in a first converted band, and the plurality of photons in the second received band to a plurality of photons in a second converted band. An image sensor receives the plurality of photons in the first converted band and the plurality of photons in the second converted band, and generates a digitized image of the scene based on the plurality of photons in the first converted band and the plurality of photons in the second converted band.

23 Claims, 7 Drawing Sheets

(56) References Cited

U.S. PATENT DOCUMENTS

| | | | |
|---|---|---|---|
| 7,972,557 | B2 | 7/2011 | Hyde et al. |
| 8,536,532 | B1* | 9/2013 | Kross ............... G01T 1/16 |
| | | | 250/361 R |
| 9,105,273 | B1 | 8/2015 | Twede et al. |
| 9,110,292 | B1 | 8/2015 | Twede et al. |
| 9,157,872 | B1 | 10/2015 | Twede |
| 2002/0117635 | A1 | 8/2002 | Shinada et al. |
| 2002/0149692 | A1* | 10/2002 | Tomita ............... G02B 15/10 |
| | | | 348/345 |
| 2005/0025280 | A1 | 2/2005 | Schulte |
| 2005/0084064 | A1 | 4/2005 | McIntyre |
| 2005/0111017 | A1 | 5/2005 | Takahashi et al. |
| 2006/0054863 | A1 | 3/2006 | Dai et al. |
| 2007/0044559 | A1 | 3/2007 | Andrews |
| 2009/0003514 | A1 | 1/2009 | Edic et al. |
| 2009/0027518 | A1* | 1/2009 | Kita ............... 348/231.99 |
| 2009/0059406 | A1 | 3/2009 | Powers et al. |
| 2010/0142062 | A1 | 6/2010 | Asami et al. |
| 2010/0261263 | A1 | 10/2010 | Vo-Dinh et al. |
| 2011/0021970 | A1* | 1/2011 | Vo-Dinh ............ A61K 49/0039 |
| | | | 604/20 |
| 2011/0129537 | A1 | 6/2011 | Vo-Dinh et al. |
| 2011/0181191 | A1 | 7/2011 | Smith et al. |
| 2011/0222658 | A1 | 9/2011 | Radley |
| 2011/0305318 | A1 | 12/2011 | Robinson |
| 2012/0027175 | A1 | 2/2012 | Radley et al. |
| 2013/0051529 | A1 | 2/2013 | Basu et al. |
| 2013/0215912 | A1 | 8/2013 | Shkunov et al. |
| 2013/0327928 | A1 | 12/2013 | Leach et al. |
| 2014/0194314 | A1 | 7/2014 | Walsworth et al. |
| 2015/0083923 | A1 | 3/2015 | Stanton et al. |

OTHER PUBLICATIONS

Author Unknown, "Sunstone Upconverting Nanocrystals UCP 475," Material Safety Data Sheet, Version 5.1, Sigma-Aldrich Co. LLC, Revised May 31, 2012, 6 pages.

Author Unknown, "Sunstone Luminescent UCP Nanocrystals," Technical Document, Sigma-Aldrich Co. LLC, http://www.sigmaaldrich.com/technical-documents/articles/biology/upconverting-ucp-nanocrystals.html, accessed Apr. 23, 2013, 6 pages.

Shun, Poh Hou, "Towards a High Quality Polarization-Entangled Multi-Photon Source," A Thesis Submitted for the Degree of Master of Science, Department of Physics, National University of Singapore, 2009, 113 pages.

Gorris et al., "Photon-upconverting nanoparticles for optical encoding and multiplexing of cells, biomolecules, and microspheres," Angewandte Chemie International Edition, vol. 52, No. 13, Mar. 25, 2013, pp. 3584-3600 (abstract only).

McCutcheon et al., "Broadband frequency conversion and shaping of single photons emitted from a nonlinear cavity," Optics Express, vol. 17, No. 25, Dec. 7, 2009, 15 pages.

Suyver et al., "Novel materials doped with trivalent lanthanides and transition metal ions showing near-infrared to visible photon upconversion," Optical Materials, vol. 27, No. 6, Mar. 2005, pp. 1111-1130 (abstract only).

Tyson, Jeff et al., "How Airport Security Works," the Pallet, vol. 55, Feb. 2008, travel.howstuffworks.com/airport-security.htm, 5 pages.

Girard, C. et al., "The physics of the near-field," Reports on Progress in Physics, vol. 63, No. 6, Jun. 2000, IOP Publishing Ltd., 46 pages.

Jain, P., "Plasmons in Assembled Metal Nanostructures: Radiative and Nonradiative Properties, Near-Field Coupling and its Universal Scaling Behavior," Doctoral Dissertation, Georgia Institute of Technology, Apr. 2008, 316 pages.

Pucci, A. et al., "Chapter 8: Electromagnetic Nanowire Resonances for Field-Enhanced Spectroscopy," Lecture Notes in Nanoscale Science and Technology, vol. 3: One-Dimensional Nanostructures, Springer Science+Business Media, LLC, 2008, pp. 175-215.

Tiwari, S. et al., "A silicon nanocrystals based memory," Applied Physics Letters, vol. 68, No. 10, Mar. 4, 1996, American Institute of Physics, 3 pages.

Ferrer, Domingo et al., "Atomic structure of three-layer Au/Pd nanoparticles revealed by aberration-corrected scanning transmission electron microscopy," Journal of Materials Chemistry, vol. 18, Mar. 19, 2008, RSCPublishing, 6 pages.

Non-Final Office Action for U.S. Appl. No. 14/169,906 mailed Sep. 18, 2014, 16 pages.

Notice of Allowance for U.S. Appl. No. 14/107,231, mailed Apr. 16, 2015, 9 pages.

Notice of Allowance for U.S. Appl. No. 14/169,906, mailed Apr. 6, 2015, 8 pages.

Notice of Allowance for U.S. Appl. No. 14/210,809, mailed Jun. 9, 2015, 7 pages.

Non-Final Office Action for U.S. Appl. No. 14/095,513, mailed Sep. 24, 2015, 19 pages.

Non-Final Office Action for U.S. Appl. No. 14/100,497, mailed Sep. 24, 2015, 9 pages.

Ye, Xingchen, et al., "Competition of shape and interaction patchiness for self-assembling nanoplates," Nature Chemistry: Advance Online Publication, vol. 5, Issue 6, Paper No. NCHEM-12070903B, May 12, 2013, Nature, www.nature.com/naturechemistry, 9 pages.

Final Office Action for U.S. Appl. No. 14/095,513, mailed Apr. 6, 2016, 14 pages.

Notice of Allowance and Applicant-Initiated Interview Summary for U.S. Appl. No. 14/100,497, mailed Apr. 29, 2016, 10 pages.

Non-Final Office Action for U.S. Appl. No. 14/880,612, mailed Apr. 21, 2016, 18 pages.

Notice of Allowance for U.S. Appl. No. 14/095,513, mailed Jun. 14, 2016, 9 pages.

* cited by examiner

MULTI-SPECTRAL PHOTON CONVERTING IMAGING APPARATUS

RELATED APPLICATIONS

This application claims the benefit of provisional patent application Ser. No. 61/645,514, filed May 10, 2012, the disclosure of which is hereby incorporated herein by reference in its entirety.

TECHNICAL FIELD

The embodiments generally relate to imaging, and in particular to converting photons in received spectral bands to photons in converted spectral bands for imaging.

BACKGROUND

Many applications utilize the detection of photons in non-visible bands, such as photons in the infrared bands, or the X-ray bands. Surveillance is an example of one such application. Image sensors that are able to detect non-visible electromagnetic radiation are relatively costly, due in part to the chemical composition of the elements required to detect energy in such bands, and the cooling requirements of such image sensors. Moreover, such image sensors are generally lower resolution than image sensors used to capture electromagnetic radiation in the converted bands. The cost and operational requirements for such image sensors inhibits their widespread use in many applications.

Image sensors used to capture electromagnetic radiation in the converted bands, on the other hand, are relatively inexpensive, do not generally have special cooling requirements, and are of increasingly high resolution.

SUMMARY

The embodiments relate to the multi-spectral conversion of photons in received bands to photons in converted bands, and the detection and imaging thereof. In one embodiment, a plurality of photons in a first received band and a plurality of photons in a second received band from a scene are received at a first nanoparticle (NP) photon conversion material. The first NP photon conversion material converts the plurality of photons in the first received band to a plurality of photons in a first converted band, and the plurality of photons in the second received band to a plurality of photons in a second converted band. An image sensor receives the plurality of photons in the first converted band and the plurality of photons in the second converted band, and generates a digitized image of the scene based on the plurality of photons in the first converted band and the plurality of photons in the second converted band.

Among other advantages, the embodiments may utilize relatively low-cost, widely available image sensors to generate an image that depicts the emission or reflection of photons in received bands from a scene.

In one embodiment, photons in different infrared bands are converted to photons in different visible bands. For example, photons in a short-wave infrared band may be converted to photons in a blue visible band, photons in a mid-wave infrared band may be converted to photons in a green visible band, and photons in a long-wave infrared band may be converted to photons in a red visible band.

In another embodiment, photons within a particular received band may be converted to multiple converted bands. For example, photons in a first mid-wave infrared band may be converted to photons in a blue visible band, photons in a second mid-wave infrared band may be converted to photons in a green visible band, and photons in a third mid-wave infrared band may be converted to photons in a red visible band.

In one embodiment, the first NP photon conversion material may be pumped, or preloaded, to a higher energy level prior to the photon conversion process. In particular, during a down-cycle, sometimes referred to as an off-cycle, of the image sensor, an energy source that increases an energy level of the first NP photon conversion material may be activated. Prior to an up-cycle, sometimes referred to as an on-cycle, of the image sensor, the energy source is deactivated, leaving the first NP photon conversion material in a pumped energy state during the receipt of the plurality of photons in the first received band and the plurality of photons in the second received band from the scene. Such preloading may facilitate higher conversion efficiency, and reduce dark noise.

In one embodiment, an imaging apparatus is provided. The imaging apparatus includes a first NP photon conversion material that is configured to convert a plurality of photons in a first received band to a plurality of photons in a first converted band, and a plurality of photons in a second received band to a plurality of photons in a second converted band. The imaging apparatus also includes an image sensor that is configured to receive the plurality of photons in the first converted band and the plurality of photons in the second converted band, and generate a digitized image of the scene based on the plurality of photons in the first converted band and the plurality of photons in the second converted band.

In one embodiment, the imaging apparatus includes a first lens arrangement positioned in a path of the first plurality of photons and the second plurality of photons. The first lens arrangement is configured to direct the first plurality of photons and the second plurality of photons onto the first NP photon conversion material. In one embodiment, the first lens arrangement may be replaceable with another lens arrangement to facilitate detection and conversion of any desired received band to any desired converted band. Thus, the imaging apparatus may include a lens arrangement receiver that has a released mode and an engaged mode, and is configured to fix the first lens arrangement with respect to the first NP photon conversion material when in the engaged mode. This feature facilitates the use of different lens arrangements based on the particular received bands of photons of interest.

In one embodiment, the first NP photon conversion material may be positioned a distance from the image sensor, and the imaging apparatus may include a second lens arrangement that is positioned in a path of a third plurality of photons and a fourth plurality of photons. The second lens arrangement is configured to direct the third plurality of photons and the fourth plurality of photons onto the image sensor.

The imaging apparatus may also include a NP photon conversion material receiver that has a released mode and an engaged mode, and is configured to fix the NP photon conversion material with respect to the image sensor when in the engaged mode. This feature facilitates the use of different NP photon conversion materials based on the particular received bands of photons of interest.

In one embodiment, the NP photon conversion material comprises a coating on a surface of the image sensor. The image sensor may include a glass, or other relatively thin transmissive substrate, wherein the NP photon conversion material is a coating on a first surface of the substrate, and a second surface of the substrate is adjacent to a photodetector array of the image sensor. In such embodiment, the imaging apparatus may include an image sensor receiver that has a released mode and an engaged mode, and is configured to fix the image sensor with respect to the NP photon conversion material when in the engaged mode. This feature facilitates the use of different image sensors based on the particular received bands of photons of interest.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The embodiments relate to the conversion of photons in received bands to photons in converted bands, and the detection and imaging thereof. Among other advantages, some embodiments facilitate the use of relatively low cost, widely available image sensors to generate images based on photons in received bands that such image sensors would not be capable of detecting.

Figure 1:
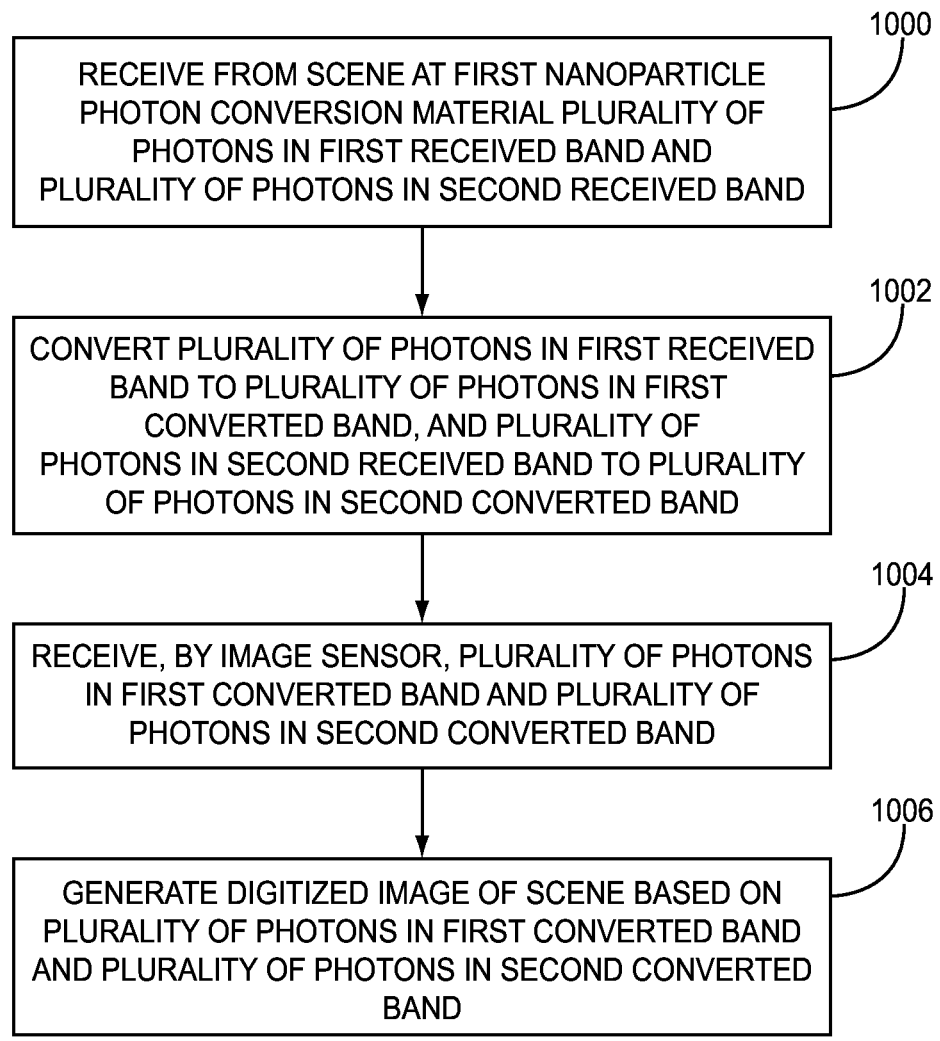
FIG. 1 is a flowchart of a process for generating an image according to one embodiment.

FIG. 1 is a flowchart of a process for generating an image according to one embodiment. A nanoparticle (NP) photon conversion material receives from a scene a plurality of photons in a first received band and a plurality of photons in a second received band (block 1000). The use herein of ordinals, such as first, second, or third, in conjunction with an element is solely for distinguishing what might otherwise be similar or identical labels, such as "first band" and "second band," and does not imply a priority, a type, an importance, or other attribute, unless otherwise stated herein. The phrase "band" refers to a range of photon wavelengths.

The NP photon conversion material converts the plurality of photons in the first received band to a plurality of photons in a first converted band, and the plurality of photons in the second received band to a plurality of photons in a second converted band (block 1002). The number of photons in the first received band may differ from the number of photons in the first converted band. An image sensor receives the plurality of photons in the first converted band and the plurality of photons in the second converted band (block 1004). The image sensor generates a digitized image of the scene based on the plurality of photons in the first converted band and the plurality of photons in the second converted band (block 1006). For purposes of illustration, many of the embodiments will be discussed in the context of received bands comprising non-visible bands, and converted bands comprising visible and/or near-infrared bands, but the embodiments are not limited to converted bands of any particular wavelengths. However, the conversion of photons to visible and/or near-infrared bands, in some embodiments, may facilitate the use of relatively low-cost image sensors used widely in digital cameras since such low-cost image sensors are typically sensitive in the visible and near-infrared bands.

Figure 2:
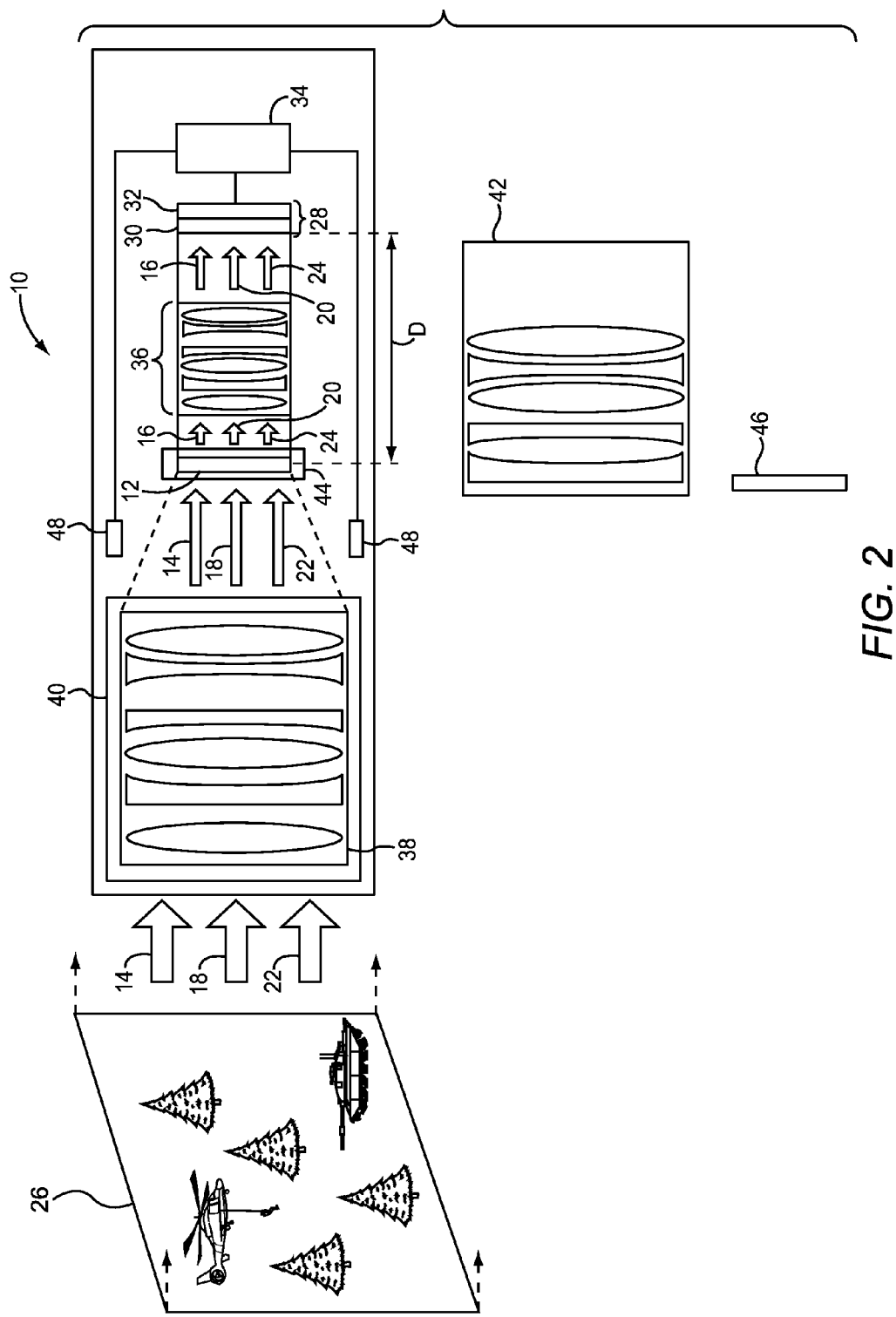
FIG. 2 is a block diagram of a multi-spectral imaging apparatus according to one embodiment.

FIG. 2 is a block diagram of a multi-spectral imaging apparatus 10 according to one embodiment. The imaging apparatus 10 includes a first NP photon conversion material 12 that is configured to convert one or more pluralities of photons in received bands to corresponding pluralities of photons in converted bands. For purposes of illustration, the embodiments will be discussed herein in the context of three received bands and three converted bands, but the embodiments are not limited to any number of received bands or converted bands. Generally, the number of bands utilized will be system dependent, and in large part may be dependent on the particular image sensor used, as discussed in greater detail herein.

In this example, the first NP photon conversion material 12 is configured to convert a plurality of photons 14 in a first received band to a plurality of photons 16 in a first converted band, a plurality of photons 18 in a second received band to a plurality of photons 20 in a second converted band, and a plurality of photons 22 in a third received band to a plurality of photons 24 in a third converted band. The plurality of photons 14 in the first received band, the plurality of photons 18 in the second received band and the plurality of photons 22 in the third received band are received from a scene 26, which may comprise, for example, all objects and matter that falls within the field of view (FOV) of the imaging apparatus 10, or the FOV of a device to which the imaging apparatus 10 is communicatively coupled.

The first NP photon conversion material 12 comprises materials, such as frequency converting nanocrystals, that are capable of "upconverting" photons of one energy level to photons of a higher energy level, such as upconverting photons in an infrared band to photons in a visible band or other converted band, or "downconverting" photons of one energy level to photons of a lower energy level, such as downconverting photons in an X-ray band to photons in a visible band or other converted band. In one embodiment, the first NP photon conversion material 12 may be coated onto a glass, or other transmissive substrate, that is transparent to photons in the converted bands, according to the particular upconverting or downconverting scheme used.

Generally such materials are engineered to absorb energy at one wavelength and emit energy at a different wavelength, thus "converting" photons of one band to photons of another band. Such materials may be synthesized, for example, using specific compositions of individual rare earth elements and other host elements. Upconversion may occur through a combination of a trivalent rare-earth sensitizer (e.g. Yb, Nd, Er, or Sm) as the element that initially absorbs the electromagnetic radiation and a second lanthanide activator (e.g. Er, Ho, Pr, Tm) ion in an optical passive crystal lattice that serves as the emitting elements. By varying the concentrations and ratios of rare earth elements, different emission spectra can be elicited from the same combination of elements. Such materials are available, for example, from Sigma-Aldrich, 3050 Spruce Street, St. Louis, Mo. 63103. In some embodiments, the first NP photon conversion material 12 may comprise a mixture of elements that performs the desired conversion of received bands to converted bands, or alternatively, the first NP photon conversion material 12 may be patterned in a desired configuration, such as a striped configuration, a checkerboard configuration, or may be configured as grating planes, or as a linear variable filter.

The imaging apparatus 10 also includes an image sensor 28 that is configured to receive the plurality of photons 16 in the first converted band, the plurality of photons 20 in the second converted band, and the plurality of photons 24 in the third converted band, and based thereon, generate a digital image. The image sensor 28 comprises a photodetector array 30 and readout circuitry 32. Some of the functionality discussed herein with regard to the imaging apparatus 10 may be implemented under the control of a controller 34. The controller 34 may comprise a programmable central processing unit (CPU), application specific integrated circuit, or the like, that is configured to implement functionality discussed herein. In one embodiment, programming instructions may be stored on a memory (not illustrated), and executed by the controller 34 to implement functionality described herein.

The photodetector array 30 is multi-spectral and capable of detecting photons at different bands, and in particular capable of detecting photons at the different converted bands that are received by the photodetector array 30. In one embodiment, the photodetector array 30 includes a color-filter array capable of separating different incoming visible and/or near-infrared converted bands.

In the embodiment illustrated in FIG. 2, the first NP photon conversion material 12 may be positioned at a distance D from the image sensor 28. The distance D may position the first NP photon conversion material 12 in an image plane that is conjugant to an image plane of the photodetector array 30. While the distance D is system dependent, the distance D, in some embodiments, may range from 1 mm to 100 mm. The imaging apparatus 10 may include a lens arrangement 36 that is configured to direct the plurality of photons 16 in the first converted band, the plurality of photons 20 in the second converted band, and the plurality of photons 24 in the third converted band onto the image sensor 28.

The imaging apparatus 10 may also include a lens arrangement 38 that is configured to direct the plurality of photons 14 in the first received band, the plurality of photons 18 in the second received band and the plurality of photons 22 in the third received band onto the first NP photon conversion material 12. The lens arrangement 38 may be configured to direct photons in particular received bands, but be incapable of, or less efficient at, directing photons of other received bands. Accordingly, in one embodiment, the imaging apparatus 10 includes a lens arrangement receiver 40 that has a released mode and an engaged mode. The lens arrangement receiver 40 is configured to fix the lens arrangement 38 with respect to the first NP photon conversion material 12 when in the engaged mode. In the released mode, a user may remove the lens arrangement 38 from the lens arrangement receiver 40, and insert a different lens arrangement 42 that may be configured to direct photons in one or more different received bands onto the first NP photon conversion material 12. The lens arrangement receiver 40 may comprise any suitable interface, such as a threaded interface, friction interface, or the like.

Similarly, the first NP photon conversion material 12 may be configured to convert pluralities of photons of particular received bands into corresponding pluralities of photons of converted bands, but be ineffective at converting photons of other received bands. Accordingly, the imaging apparatus 10 may include a NP photon conversion material receiver 44 that has a released mode and an engaged mode, and that is configured to fix the NP photon conversion material 12 with respect to the image sensor 28 when in the engaged mode. If the detection of different pluralities of received bands are of interest to a user, the user may release the first NP photon conversion material 12 from the NP photon conversion material receiver 44, and insert a second NP photon conversion material 46 into the NP photon conversion material receiver 44. Thus, the imaging apparatus 10 may facilitate the conversion of any desired pluralities of photons of received bands to desired pluralities of photons of converted bands through the selection of a particular NP photon conversion material, and inserting particular NP photon conversion material into the NP photon conversion material receiver 44.

For example, the first NP photon conversion material 12 may convert a plurality of photons in the short-wave infrared band to a plurality of photons in a red visible band, and a plurality of photons in the mid-wave infrared band to a plurality of photons in a blue visible band. The second NP photon conversion material 46 may convert a plurality of photons in a particular long-wave infrared band to a plurality of photons in a red visible band, and a plurality of photons in a different long-wave infrared band to a plurality of photons in a blue visible band.

The use of different NP photon conversion materials may be done independent of, or in conjunction with, the use of a particular lens arrangement 38, 42, and insertion thereof into the lens arrangement receiver 40. For example, the lens arrangement 38 may be configured to direct photons in the short-wave and mid-wave infrared bands. The lens arrangement 42 may be configured to direct photons in the long-wave band. Different NP photon conversion materials and/or lens arrangements may be used to generate images of the same scene 26.

The imaging apparatus 10 may include one or more energy sources 48 that are configured to increase an energy level of the first NP photon conversion material 12. Increasing the energy level of the first NP photon conversion material 12 may increase photon conversion efficiency. The energy sources 48 may emit energy at a particular wavelength that when absorbed by the first NP photon conversion material 12 increases the energy level of the first NP photon conversion material 12. In one embodiment, during a down-cycle, sometimes referred to as an off-cycle, of the image sensor 28, the controller 34 may activate the energy sources 48 to emit energy at the desired wavelength(s) for a period of time during the off-cycle. The controller 34 may then, immediately prior to an up-cycle, sometimes referred to as an on-cycle, of the image sensor 28, deactivate the energy sources 48. In other embodiments, particularly wherein the energy sources 48 comprise an electromagnetic field, or an electron beam, the energy sources 48 may remain continuously on during off- and on-cycles of the image sensor 28. In some embodiments, the energy sources 48 may comprise an electromagnetic energy source, such as a laser light, or an electric energy source, such as a static field generated from a transparent capacitor plate positioned on either side of the first NP photon conversion material 12.

Figure 3:
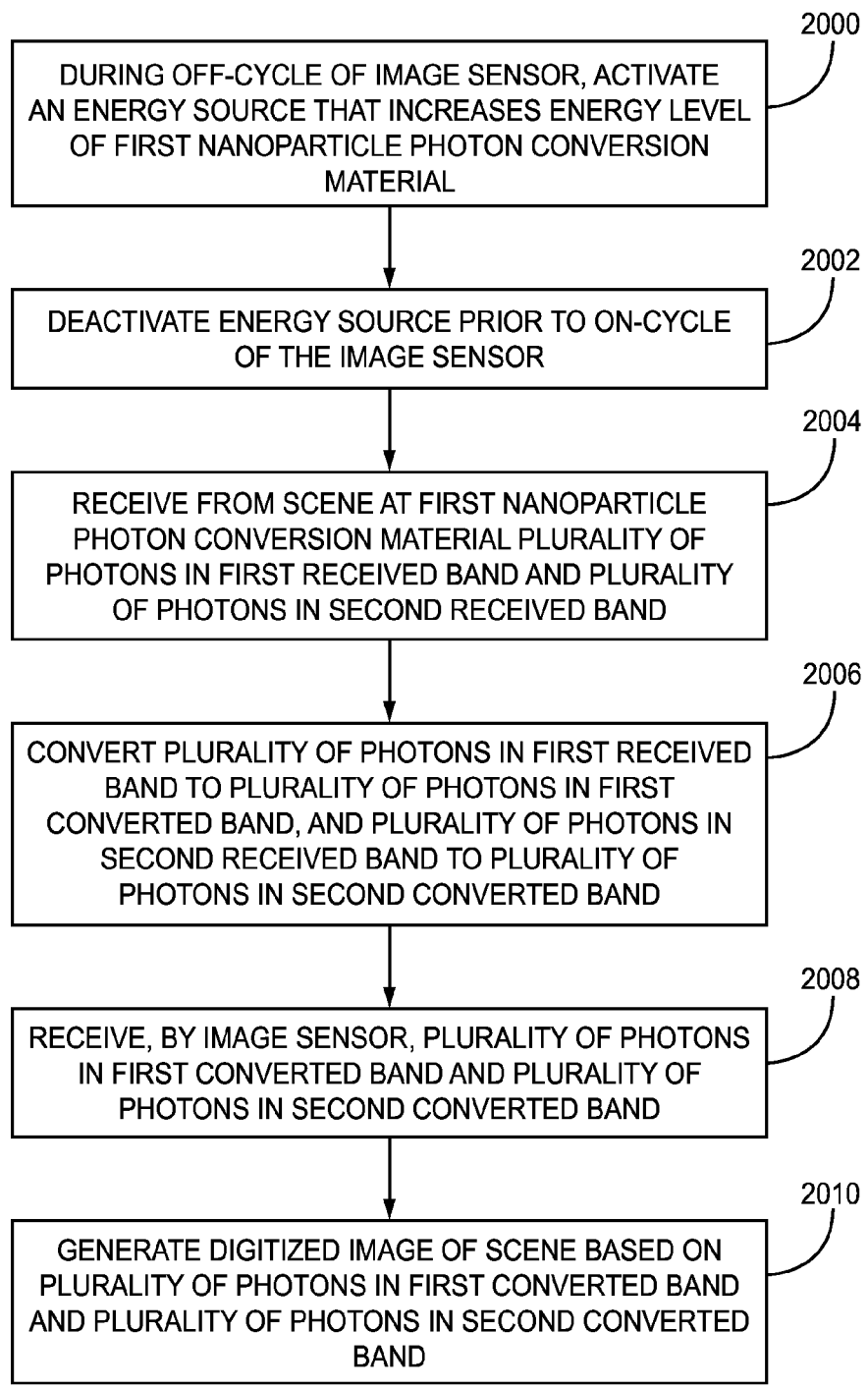
FIG. 3 is a flowchart of a method for increasing an energy level of a nanoparticle photon conversion material according to one embodiment.

FIG. 3 is a flowchart of a method for increasing an energy level of a NP photon conversion material according to one embodiment, and will be discussed in conjunction with FIG. 2. During an off-cycle of the image sensor 28, the controller 34 activates the energy sources 48 to increase the energy level of the first NP photon conversion material 12 (block 2000). Prior to the on-cycle of the image sensor 28, the controller 34 deactivates the energy sources 48 (block 2002). Processing in blocks 2004-2010 may be substantially similar or identical to blocks 1000-1006, respectively, as described above with regard to FIG. 1.

Figure 4:
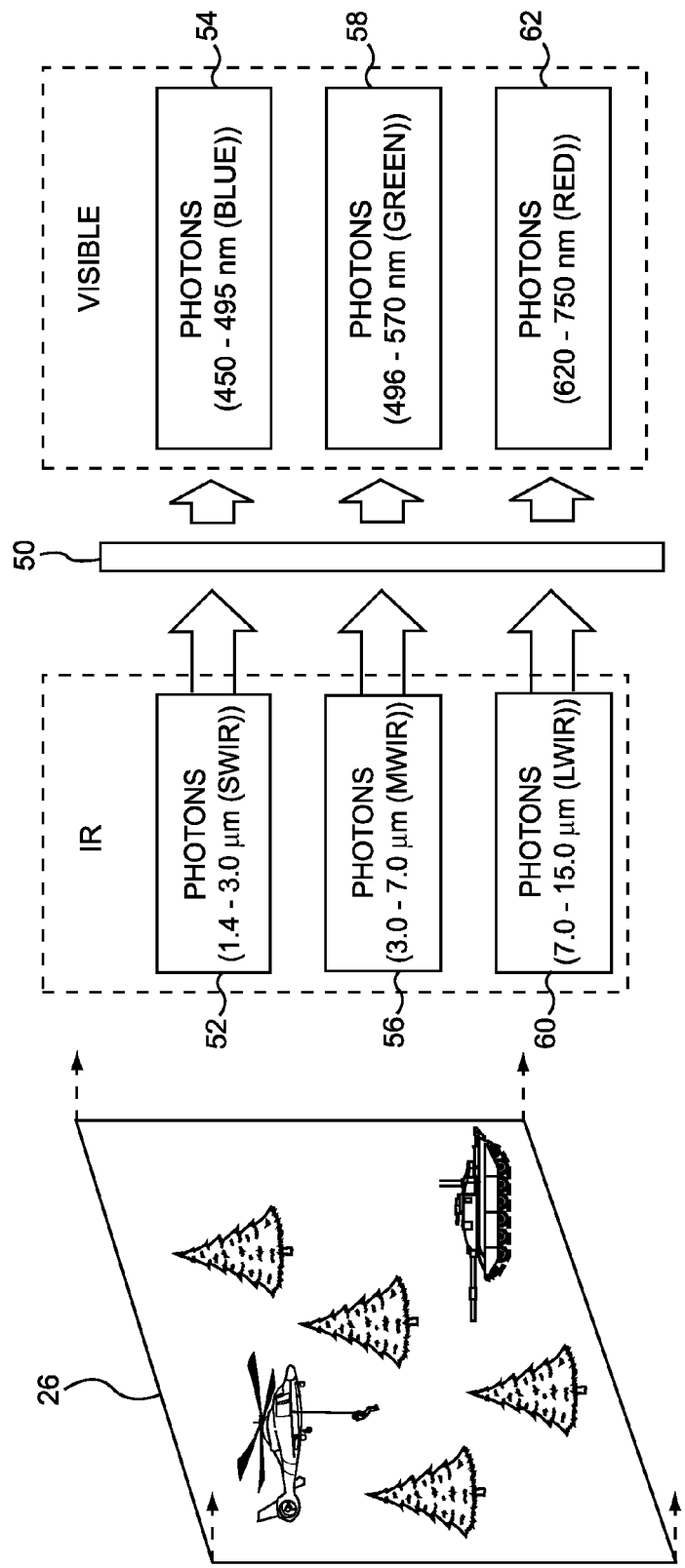
FIG. 4 is a block diagram illustrating an example conversion of pluralities of photons in received bands to corresponding pluralities of photons in converted bands according to one embodiment.

FIG. 4 is a block diagram illustrating an example conversion of pluralities of photons in received bands to corresponding pluralities of photons in converted bands according to one embodiment. In this embodiment, a NP photon conversion material 50 is configured to convert a plurality of photons 52 in a short-wave infrared band comprising wavelengths of about 1.4 µm to about 3.0 µm to a plurality of photons 54 in a blue visible band comprising wavelengths of about 450 nm to about 495 nm. The NP photon conversion material 50 is also configured to convert a plurality of photons 56 in a mid-wave infrared band comprising wavelengths of about 3.0 µm to about 7.0 µm to a plurality of photons 58 in a green visible band comprising wavelengths of about 496 nm to about 570 nm. The NP photon conversion material 50 is also configured to convert a plurality of photons 60 in a long-wave infrared band comprising wavelengths of about 7.0 µm to about 15.0 µm to a plurality of photons 62 in a red visible band comprising wavelengths of about 620 nm to about 750 nm.

Figure 5:
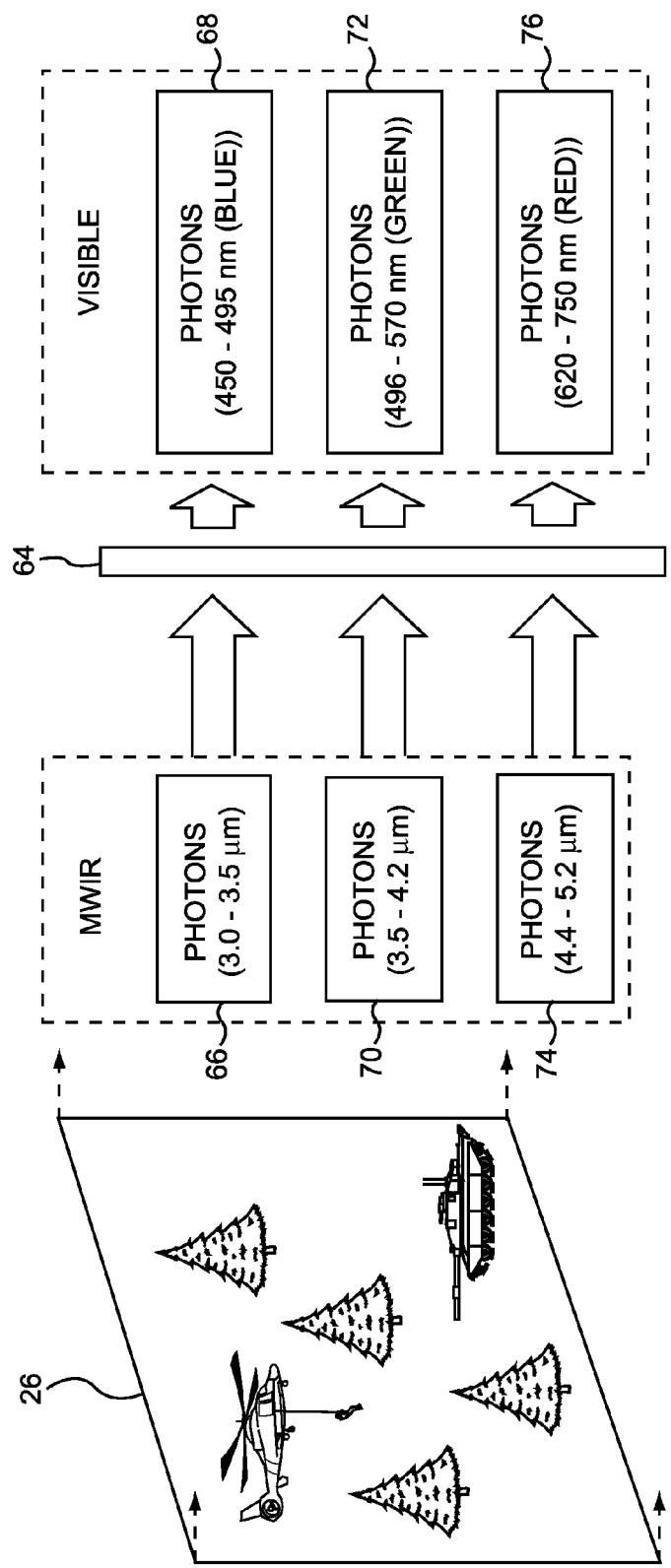
FIG. 5 is a block diagram illustrating an example conversion of pluralities of photons in received bands to corresponding pluralities of photons in converted bands according to another embodiment.

FIG. 5 is a block diagram illustrating an example conversion of pluralities of photons in received bands to corresponding pluralities of photons in converted bands according to another embodiment. In this embodiment, a NP photon conversion material 64 is configured to convert a plurality of photons 66 in a first mid-wave infrared band comprising wavelengths of about 3.0 µm to about 3.511M to a plurality of photons 68 in a blue visible band comprising wavelengths of about 450 nm to about 495 nm. The NP photon conversion material 64 is also configured to convert a plurality of photons 70 in a second mid-wave infrared band comprising wavelengths of about 3.5 µm to about 4.2 µm to a plurality of photons 72 in a green visible band comprising wavelengths of about 496 nm to about 570 nm. The NP photon conversion material 64 is also configured to convert a plurality of photons 74 in a third mid-wave infrared band comprising wavelengths of about 4.4 µm to about 5.2 µm to a plurality of photons 76 in a red visible band comprising wavelengths of about 620 nm to about 750 nm. Thus, as illustrated by FIGS. 4 and 5, any desired granularity of photons of received bands may be converted to a corresponding converted band for imaging by the image sensor 28.

Figure 6:
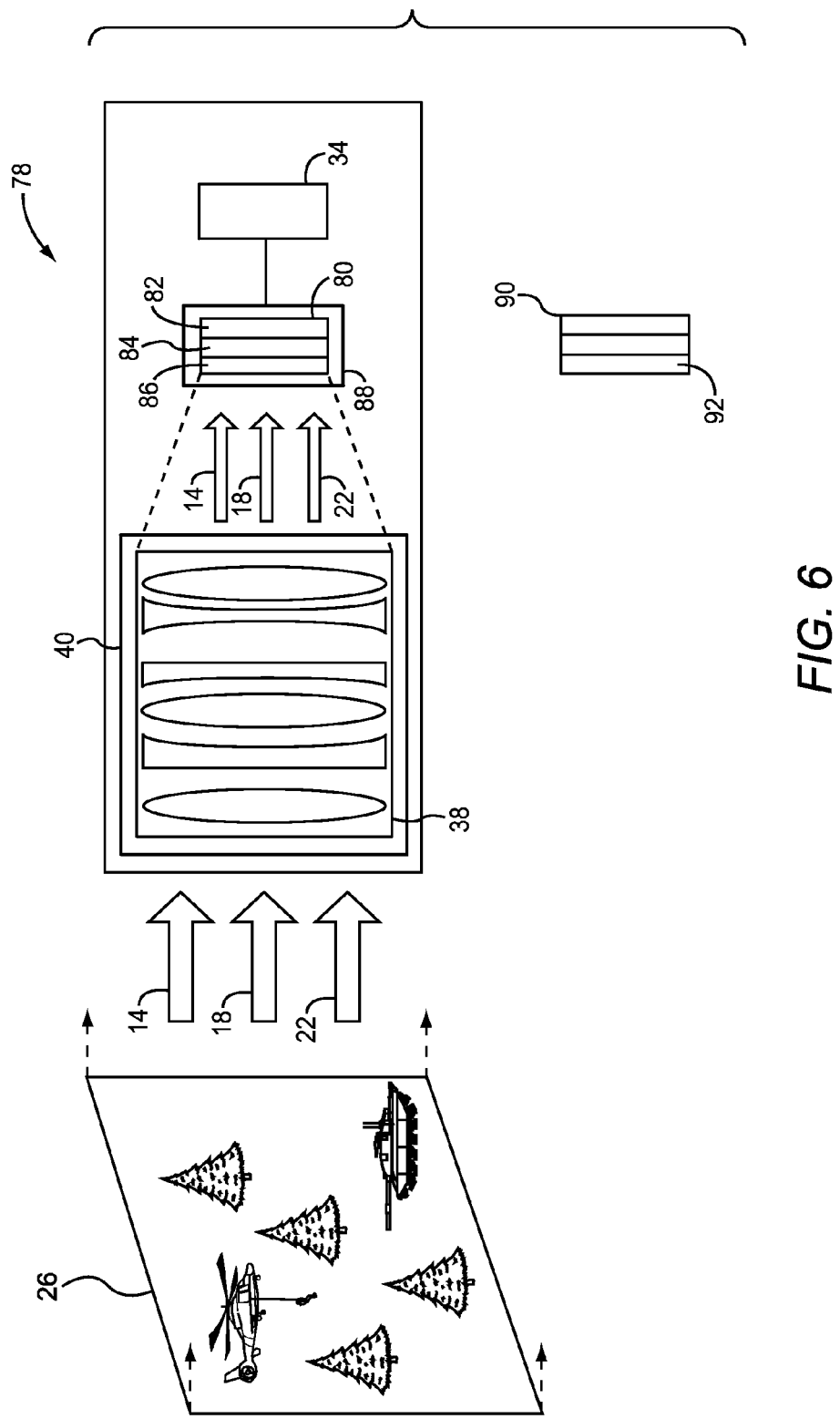
FIG. 6 illustrates a block diagram of a multi-spectral imaging apparatus according to another embodiment.

While FIGS. 5 and 6, for purposes of illustration, discuss the conversion of photons in infrared received bands, the embodiments are not so limited. The embodiments have applicability in a variety of received bands, including the X-ray and ultraviolet received bands.

FIG. 6 illustrates a block diagram of an imaging apparatus 78 according to another embodiment. In this embodiment, the imaging apparatus 78 comprises an image sensor 80 that comprises readout circuitry 82, photodetector array 84, and a NP photon conversion material 86. Thus, in this embodiment, the NP photon conversion material 86 is integrated with the photodetector array 84 and the readout circuitry 82. In this embodiment, a manufacturer of the image sensor 80 may apply the NP photon conversion material 86 onto a surface that is in proximity to the photodetector array 84, such as one or more microns from the photodetector array 84.

In this embodiment, the NP photon conversion material 86 may be configured to convert pluralities of photons 14, 18, 22 of particular received bands into corresponding pluralities of photons of converted bands, but be ineffective at converting photons of other received bands. Accordingly, the imaging apparatus 78 may include an image sensor receiver 88 that has a released mode and an engaged mode, and is configured to fix the image sensor 80 with respect to the lens arrangement 38 when in the engaged mode. In order to detect different pluralities of received bands, the user may release the image sensor 80 from the image sensor receiver 88, and insert a suitable second image sensor 90 into the image sensor receiver 88. The second image sensor 90 may include a second NP photon conversion material 92 that is configured to convert different pluralities of received bands to corresponding pluralities of photons of converted bands than that of the NP photon conversion material 86.

Figure 7:
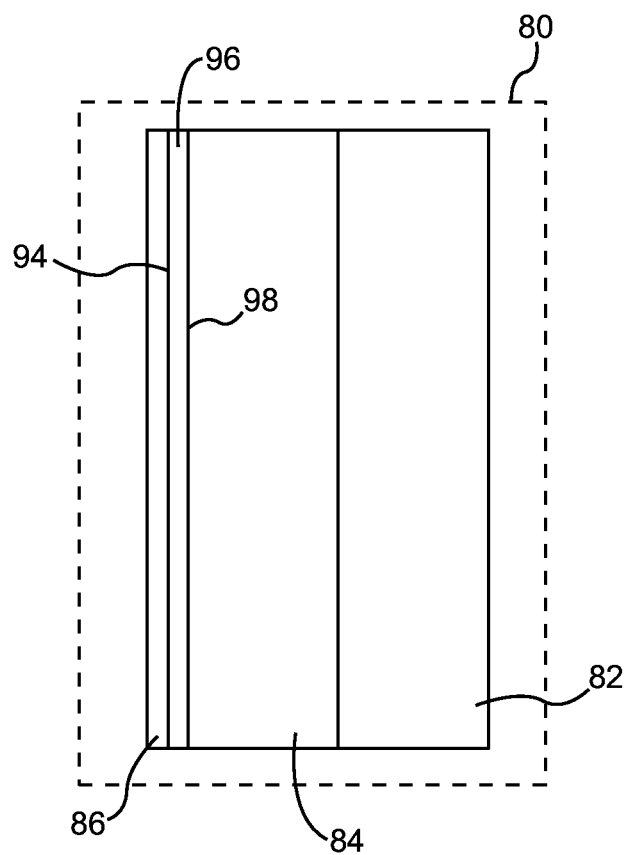
FIG. 7 is a block diagram of an image sensor illustrated in FIG. 6 according to one embodiment.

FIG. 7 is a block diagram of the image sensor 80 according to one embodiment. The NP photon conversion material 86 may be coated on a first surface 94 of a glass, or other transmissive substrate 96. The substrate 96 may comprise any suitable transmissive substrate that allows the emission of photons in converted bands toward the photodetector array 84. A second surface 98 of the substrate 96 is adjacent to the photodetector array 84. In one embodiment, the NP photon conversion material 86 coated on the first surface 94 of the transmissive substrate 96 is a distance no more than one order (<10) of the converted band of wavelengths away from the photodetector array 84.

The present embodiments, for purposes of illustration, have been described in the context of particular received bands and particular converted bands, but the embodiments are not so limited, and apply to any received bands that may be converted to any converted bands by a suitable NP photon conversion material. Other non-limiting examples of such bands include a first received band that comprises a long-wave infrared band, a second received band that comprises a first mid-wave infrared band, a first converted band that comprises a second mid-wave infrared band that is different from the first mid-wave infrared band, and a second converted band that comprises a short-wave infrared band. Additional non-limiting examples include the conversion of one or more received long-wave infrared bands to one or more corresponding converted short-wave infrared bands, the conversion of one or more received ultraviolet bands to one or more corresponding converted visible (e.g., red, blue, or green) bands, and the conversion of one or more received X-ray bands to one or more corresponding converted ultraviolet bands.

The present embodiments have wide applicability and may be utilized in any context in which the detection and imaging of electromagnetic radiation is desirable. One example application includes, for example, the conversion of pluralities of photons in mid-wave infrared received bands to corresponding pluralities of photons in converted bands for use in target recognition applications based on shape and spectral content. Another application includes, for example, the conversion of pluralities of photons in ultraviolet received bands in conjunction with the conversion of pluralities of photons in a mid-wave infrared received band to corresponding pluralities of photons in converted bands for use in missile warning systems. Such application may facilitate hot plume detection with significant clutter reduction. Additional applications include the conversion of pluralities of ultraviolet received bands to corresponding converted bands in fingerprint applications, factory quality imaging applications, various consumer products, and hot plume imaging. The embodiments also have applicability in realtime X-ray applications, such as medical applications, security applications, manufacturing applications, applications in the food industry, and the like. The embodiments also have wide applicability in spectroscopy applications.

Those skilled in the art will recognize improvements and modifications to the preferred embodiments of the present disclosure. All such improvements and modifications are considered within the scope of the concepts disclosed herein and the claims that follow.

What is claimed is:

1. A method, comprising:
   receiving, from a scene by a first nanoparticle photon conversion material, a plurality of photons in a first received band and a plurality of photons in a second received band, the photon conversion material being coated on a first surface of a transmissive substrate having the first surface and a second surface, the second surface being adjacent to a photodetector array of an image sensor;
   converting, by the first nanoparticle photon conversion material, the plurality of photons in the first received band to generate a plurality of new photons in a first converted band, and the plurality of photons in the second received band to generate a plurality of new photons in a second converted band;
   receiving, by the image sensor, the plurality of new photons in the first converted band and the plurality of new photons in the second converted band; and
   generating a digitized image of the scene based on the plurality of new photons in the first converted band and the plurality of new photons in the second converted band.

2. The method of claim 1, wherein the first received band comprises a short-wave infrared band, and the first converted band comprises one of a red visible band, a green visible band, and a blue visible band.

3. The method of claim 2, wherein the second received band comprises a mid-wave infrared band, and the second converted band comprises one of the red visible band, the green visible band, and the blue visible band, wherein the second converted band is a different band than the first converted band.

4. The method of claim 1, further comprising receiving, from the scene by the first nanoparticle photon conversion material, a plurality of photons in a third received band;
   converting, by the first nanoparticle photon conversion material, the plurality of photons in the third received band to generate a plurality of new photons in a third converted band;
   receiving, by the image sensor, the plurality of new photons in the third converted band; and
   generating the digitized image of the scene based on the plurality of new photons in the first converted band, the plurality of new photons in the second converted band, and the plurality of new photons in the third converted band.

5. The method of claim 4, wherein the first received band comprises a short-wave infrared band, the second received band comprises a mid-wave infrared band, the third received band comprises a long-wave infrared band, and each of the first converted band, the second converted band, and the third converted band comprise one of a red visible band, a green visible band, and a blue visible band, and wherein each of the first converted band, the second converted band, and the third converted band comprises a different band.

6. The method of claim 4, wherein the first received band comprises a first mid-wave infrared band, the second received band comprises a second mid-wave infrared band that differs from the first mid-wave infrared band, and the third received band comprises a third mid-wave infrared band that differs from the first mid-wave infrared band and the second mid-wave infrared band, and wherein each of the first converted band, the second converted band, and the third converted band comprises one of a red visible band, a green visible band, and a blue visible band, and wherein each of the first converted band, the second converted band, and the third converted band comprises a different band.

7. The method of claim 1, wherein the first received band comprises a first X-ray band, and the first converted band comprises one of a red visible band, a green visible band, and a blue visible band.

8. The method of claim 7, wherein the second received band comprises a second X-ray band that differs from the first X-ray band, and the second converted band comprises one of a red visible band, a green visible band, and a blue visible band, wherein the second converted band is a different band than the first converted band.

9. The method of claim 1, further comprising:
   during an off-cycle of the image sensor, activating an energy source that increases an energy level of the first nanoparticle photon conversion material; and
   deactivating the energy source during an on-cycle of the image sensor.

10. The method of claim 1, further comprising:
    activating an energy source that increases an energy level of the first nanoparticle photon conversion material continuously during a plurality of off-cycles and a plurality of on-cycles.

11. The method of claim 1, further comprising directing, by a first lens arrangement, the plurality of photons in the first received band and the plurality of photons in the second received band to the first nanoparticle photon conversion material.

12. The method of claim 11, further comprising directing, by a second lens arrangement, the plurality of new photons in the first converted band and the plurality of new photons in the second converted band to the image sensor.

13. The method of claim 1, further comprising:
    replacing the first nanoparticle photon conversion material with a second nanoparticle photon conversion material;
    receiving, from the scene by the second nanoparticle photon conversion material, a plurality of photons in a third received band and a plurality of photons in a fourth received band;
    converting, by the second nanoparticle photon conversion material, the plurality of photons in the third received band to generate a second plurality of new photons in the first converted band, and the plurality of photons in the fourth received band to generate a second plurality of new photons in the second converted band;

receiving, by the image sensor, the second plurality of new photons in the first converted band and the second plurality of new photons in the second converted band; and generating a second digitized image of the scene based on the second plurality of new photons in the first converted band and the second plurality of new photons in the second converted band.

14. The method of claim 1, wherein the first received band comprises a long-wave infrared band, the second received band comprises a first mid-wave infrared band, the first converted band comprises a second mid-wave infrared band that is different from the first mid-wave infrared band, and the second converted band comprises a short-wave infrared band.

15. An imaging apparatus, comprising:
a first nanoparticle photon conversion material, the first nanoparticle photon conversion material configured to:
convert a plurality of photons in a first received band to generate a plurality of new photons in a first converted band, and a plurality of photons in a second received band to generate a plurality of new photons in a second converted band; and
an image sensor comprising:
a photodetector array; and
a transmissive substrate having a first surface and a second surface, the first surface having the first nanoparticle photon conversion material coated thereon, and the second surface being adjacent to the photodetector array;
the image sensor configured to:
receive the plurality of new photons in the first converted band and the plurality of new photons in the second converted band; and
generate a digitized image of a scene based on the plurality of new photons in the first converted band and the plurality of new photons in the second converted band.

16. The imaging apparatus of claim 15, further comprising a first lens arrangement positioned in a path of the plurality of photons in the first received band and the plurality of photons in the second received band, the first lens arrangement configured to direct the plurality of photons in the first received band and the plurality of photons in the second received band onto the first nanoparticle photon conversion material.

17. The imaging apparatus of claim 16 further comprising a second lens arrangement positioned in a path of the plurality of new photons in the first converted band and the plurality of new photons in the second converted band, the second lens arrangement configured to direct the plurality of new photons in the first converted band and the plurality of new photons in the second converted band onto the image sensor.

18. The imaging apparatus of claim 16, further comprising a lens arrangement receiver having a released mode and an engaged mode, and configured to fix the first lens arrangement with respect to the first nanoparticle photon conversion material when in the engaged mode.

19. The imaging apparatus of claim 16, further comprising an image sensor receiver having a released mode and an engaged mode, and configured to fix the image sensor with respect to the first lens arrangement when in the engaged mode.

20. The imaging apparatus of claim 15, wherein the first nanoparticle photon conversion material comprises a glass substrate.

21. The imaging apparatus of claim 15, further comprising:
an energy source configured to:
during an off-cycle of the image sensor, activate to increase an energy level of the first nanoparticle photon conversion material; and
deactivate during an on-cycle of the image sensor.

22. A method comprising:
receiving, from a scene by a first nanoparticle photon conversion material, a plurality of photons in a first X-ray band and a plurality of photons in a second X-ray band;
down converting, by the first nanoparticle photon conversion material, the plurality of photons in the first X-ray band to generate a plurality of new photons in a first ultraviolet band that is a lower energy band than the first X-ray band;
down converting, by the first nanoparticle photon conversion material, the plurality of photons in the second X-ray band to generate a plurality of new photons in a second ultraviolet band that is a lower energy band than the second X-ray band;
receiving, by an image sensor, the plurality of new photons in the first ultraviolet band and the plurality of new photons in the second ultraviolet band; and
generating a digitized image of the scene based on the plurality of new photons in the first ultraviolet band and the plurality of new photons in the second ultraviolet band.

23. A method comprising:
receiving, from a scene by a first nanoparticle photon conversion material, a plurality of photons in a first X-ray band and a plurality of photons in a second X-ray band;
down converting, by the first nanoparticle photon conversion material, the plurality of photons in the first X-ray band to generate a plurality of new photons in a first visible band that is a lower energy band than the first X-ray band;
down converting, by the first nanoparticle photon conversion material, the plurality of photons in the second X-ray band to generate a plurality of new photons in a second visible band that is a lower energy band than the second X-ray band;
receiving, by an image sensor, the plurality of new photons in the first visible band and the plurality of new photons in the second visible band; and
generating a digitized image of the scene based on the plurality of new photons in the first visible band and the plurality of new photons in the second visible band.

* * * * *

UNITED STATES PATENT AND TRADEMARK OFFICE
CERTIFICATE OF CORRECTION

PATENT NO. : 9,521,336 B1
APPLICATION NO. : 13/891692
DATED : December 13, 2016
INVENTOR(S) : David R. Twede et al.

It is certified that error appears in the above-identified patent and that said Letters Patent is hereby corrected as shown below:

In the Specification

On Column 7, Line 49, replace:
"comprising wavelengths of about 3.0 μm to about 3.511M" with --"comprising wavelengths of about 3.0 μm to about 3.5 μm"--.

Signed and Sealed this
Twenty-sixth Day of November, 2019

Andrei Iancu
*Director of the United States Patent and Trademark Office*